US010387516B2

(12) United States Patent
Wang et al.

(10) Patent No.: US 10,387,516 B2
(45) Date of Patent: Aug. 20, 2019

(54) SELECTING CONTENT WITH AN EXTERNAL LINK FOR PRESENTATION BASED ON USER INTERACTION WITH EXTERNAL CONTENT

(71) Applicant: Facebook, Inc., Menlo Park, CA (US)

(72) Inventors: Lu Wang, Fremont, CA (US); Shengbo Guo, San Jose, CA (US); Grace Louise Jackson, Belmont, CA (US); Kristin S. Hendrix, Menlo Park, CA (US); Yue Zhuo, Fremont, CA (US); Seyoung Park, Mountain View, CA (US); Yixian Zhu, Fremont, CA (US); Christopher John Leggetter, Belmont, CA (US); James Li, Pleasanton, CA (US); Michael Charles Bailey, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 209 days.

(21) Appl. No.: 15/721,577

(22) Filed: Sep. 29, 2017

(65) Prior Publication Data

US 2019/0102466 A1   Apr. 4, 2019

(51) Int. Cl.
| G06F 16/9535 | (2019.01) |
| G06Q 50/00 | (2012.01) |
| H04L 29/08 | (2006.01) |
| G06F 16/958 | (2019.01) |
| G06F 16/957 | (2019.01) |
| G06Q 30/02 | (2012.01) |

(52) U.S. Cl.
CPC ........ *G06F 16/9535* (2019.01); *G06F 16/958* (2019.01); *G06F 16/9574* (2019.01); *G06F 16/9577* (2019.01); *G06Q 30/02* (2013.01); *G06Q 50/01* (2013.01); *H04L 67/22* (2013.01); *H04L 67/306* (2013.01)

(58) Field of Classification Search
USPC ...................................................... 707/748
See application file for complete search history.

(56) References Cited

U.S. PATENT DOCUMENTS

| 8,856,141 | B1* | 10/2014 | Dean ...................... G06Q 50/01 |
| | | | 707/748 |
| 9,325,653 | B1* | 4/2016 | Peterson ................. H04L 51/24 |
| 9,378,529 | B2* | 6/2016 | Rubinstein ............. G06Q 50/01 |
| 10,291,741 | B2* | 5/2019 | Ratiu ...................... H04L 67/42 |
| 2011/0196855 | A1* | 8/2011 | Wable .................... G06Q 30/02 |
| | | | 707/711 |

(Continued)

*Primary Examiner* — Cam Linh T Nguyen
(74) *Attorney, Agent, or Firm* — Fenwick & West LLP

(57) ABSTRACT

An online system receives posts that include links to various external pages and presents those posts to users of the online system. When the online system determines an opportunity to present a post to a particular viewing user of the online system, the online system determines a quality metric and an associated value score for the post. The quality metric is determined as a likelihood that the viewing user will view the external page for less than a threshold time period, and is used to adjust the associated value score. The online system compares the value score of the post to the value scores of other posts and selects one or more of the compared posts for presentation to the viewing user of the online system.

20 Claims, 3 Drawing Sheets

(56) References Cited

U.S. PATENT DOCUMENTS

| | | | |
|---|---|---|---|
| 2012/0005224 A1* | 1/2012 | Ahrens | H04W 4/21 |
| | | | 707/769 |
| 2012/0158720 A1* | 6/2012 | Luan | G06Q 30/0224 |
| | | | 707/732 |
| 2014/0279039 A1* | 9/2014 | Systrom | G06Q 50/01 |
| | | | 705/14.66 |
| 2016/0259790 A1* | 9/2016 | Mashiach | G06F 16/9535 |
| 2017/0139919 A1* | 5/2017 | Ball | G06F 16/248 |
| 2017/0139921 A1* | 5/2017 | Ball | G06F 16/24578 |
| 2017/0142044 A1* | 5/2017 | Ball | G06F 16/23 |
| 2017/0161272 A1* | 6/2017 | Tada | G06F 16/248 |
| 2018/0091468 A1* | 3/2018 | Yong | H04L 51/32 |
| 2018/0150559 A1* | 5/2018 | Ahuja | G06F 16/951 |
| 2018/0181662 A1* | 6/2018 | Mashiach | G06Q 50/01 |
| 2018/0232460 A1* | 8/2018 | Goryachev | G06F 16/9535 |

* cited by examiner

SELECTING CONTENT WITH AN EXTERNAL LINK FOR PRESENTATION BASED ON USER INTERACTION WITH EXTERNAL CONTENT

BACKGROUND

This disclosure relates generally to the selection of content for presentation, and more specifically to content containing links to external pages.

Users may post content to online systems to be shared between other users of the online system. It is valuable for an online system to promote posts with which a viewing user is likely to interact through actions such as likes, sharing, commenting, and others. This likelihood to interact is determined according to multiple factors. For example, the online system might account for factors such as the connection between a viewing user and a posting user, the interests of the viewing user, the timestamp of the post, and others.

When opportunities to present content arise, the online system selects posts for presentation at least in part according to the probability of user interaction with the posts. This method may use a value score determined from the probability of an interaction occurring and a value associated with the interaction. Moreover, different user interactions may be considered. For example, commenting on a post may be associated with a higher value than liking a post, while sharing a post may be associated with a higher value than commenting on a post.

In the case that a post contains a link to an external landing page, the quality of the external landing page may influence the viewing user's experience of the post. A poor quality external page may contain features such as a misleading title, slow page load, technical glitches, pages that are not mobile friendly, excessive advertisements, or others. These factors may detract from a viewing user's experience of the associated post, even if the post itself does not contain negative features.

SUMMARY

Embodiments of the invention improve user experience with an online system by considering the quality of external pages linked to by posts when selecting which posts to provide to the users. In particular, the online system computes the quality of an external page (and thus a component of the quality of a post that links to the external page) based on the likelihood that a viewing user would view the external page for more than a minimum threshold time period. The act of viewing an external page for a time period before returning to the online system is known as a bounce-back, and can be defined as a "long" or "short" bounce-back (or click) according to a threshold time period spent on the external site.

The online system predicts whether a short bounce-back time is likely to occur based on features associated with the external landing page. For example, the features may include historical dwell time at the external page, a user bounce-back rate at the external page, and user average dwell time at the external page. The prediction may be made using a trained machine learning model, which is trained using historical data about previously presented posts and whether users of the online system viewed external pages linked to by those posts for more than the threshold period of time. The trained model may use features about the viewing user as well as features about the external page, thereby personalizing the determination of the quality score.

The likelihood of a short bounce-back time is associated with a quality metric of the post. The online system can use the determined likelihood to discount the quality metric, which is then used to compute the overall value score of the post. For example, a post containing a link to an external landing page determined by the online system to be of poor quality (i.e., having a higher likelihood that the user will view the external page for less than the threshold period of time) will result in a lower calculated value score than an otherwise similar post containing a link to an external landing page determined by the online system to be of higher quality. The discounted value score is then used to rank the post containing the link to the external landing page against other posts competing for placement in the opportunity. Based on ranking, the online system selects one or more posts for presentation to the viewing user and sends the selected posts for presentation.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
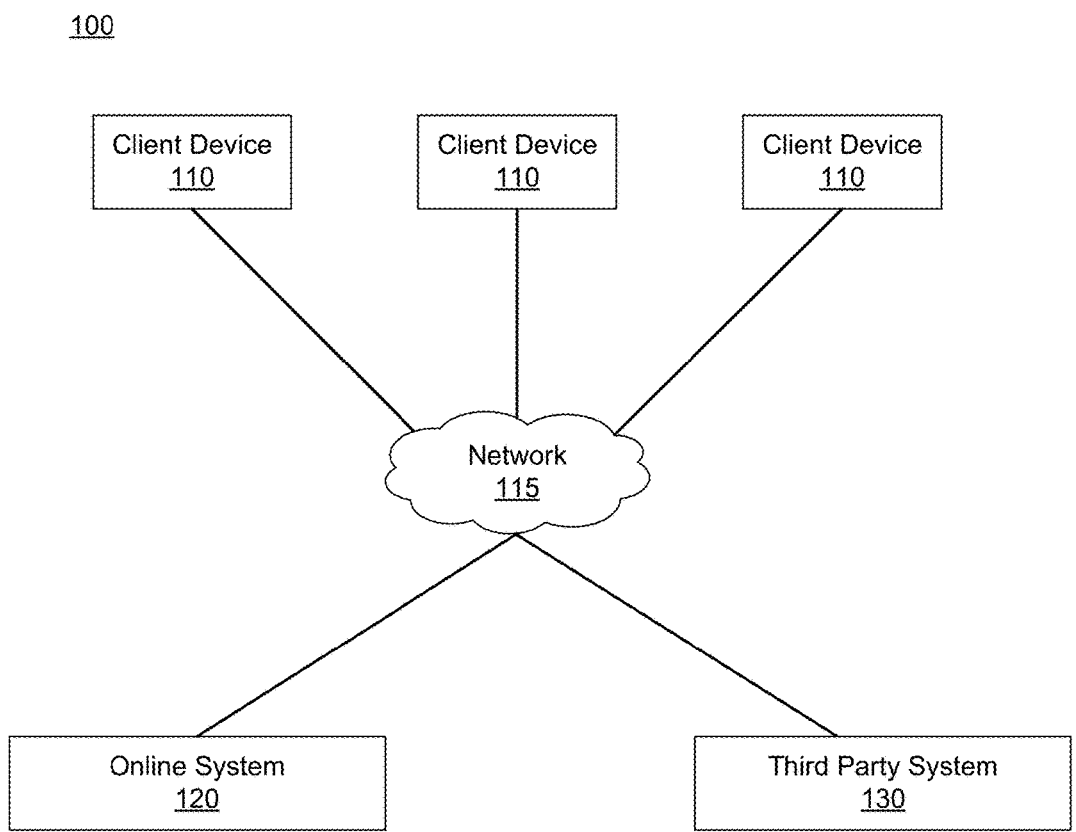
FIG. 1 is a block diagram of a system environment in which an online system operates, in accordance with an embodiment.

FIG. 1 is a block diagram of a system environment 100 for an online system 120. The system environment 100 shown by FIG. 1 comprises one or more client devices 110, a network 115, the online system 120, and one or more third party systems 130. In alternative configurations, different and/or additional components may be included in the system environment 100. For example, the online system 120 is a social networking system, a content sharing network, or another system providing content to users.

The client devices 110 are one or more computing devices capable of receiving user input as well as transmitting and/or receiving data via the network 115. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 115. In one embodiment, a client device 110 executes an application allowing a user of the client device 110 to interact with the online system 120. For example, a client device 110 executes a browser application to enable interaction between the client device 110 and the online system 120 via the network 115. In another embodiment, a client device 110 interacts with the online system 120 through an application programming interface (API) running on a native operating system of the client device 110, such as IOS® or ANDROID™.

The client devices 110 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

One or more third party systems 130 may be coupled to the network 115 for communicating with the online system 120, which is further described below in conjunction with FIG. YY. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 120, such as advertisements, content, or information about an application provided by the third party system 130.

Figure 2:
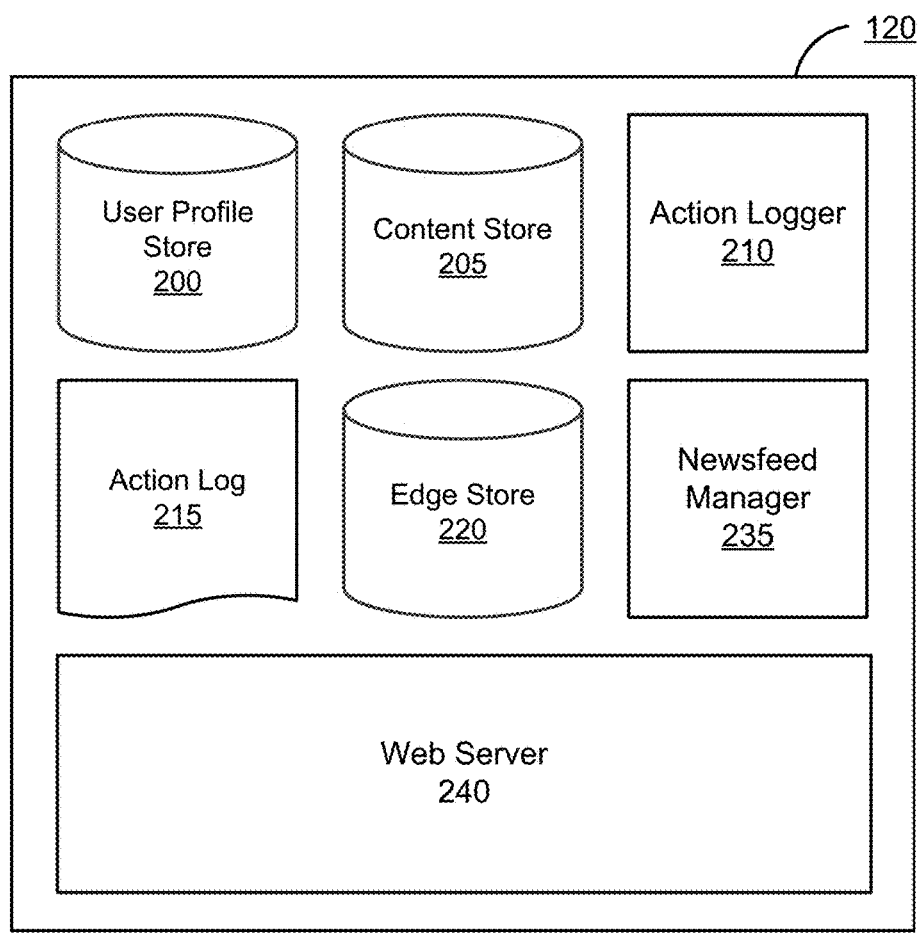
FIG. 2 is a block diagram of an architecture of the online system, in accordance with an embodiment.

FIG. 2 is a block diagram of an architecture of the online system 120. The online system 120 shown in FIG. 2 includes a user profile store 200, a content store 205, an action logger 210, an action log 215, an edge store 220, a newsfeed manager 235, and a web server 240. In other embodiments, the online system 120 may include additional, fewer, or different components for various applications. Conventional components such as network interfaces, security functions, load balancers, failover servers, management and network operations consoles, and the like are not shown so as to not obscure the details of the system architecture.

Each user of the online system 120 is associated with a user profile, which is stored in the user profile store 200. A user profile includes declarative information about the user that was explicitly shared by the user and may also include profile information inferred by the online system 120. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action log 215.

While user profiles in the user profile store 200 are frequently associated with individuals, allowing individuals to interact with each other via the online system 120, user profiles may also be stored for entities such as businesses or organizations. This allows an entity to establish a presence on the online system 120 for connecting and exchanging content with other online system users. The entity may post information about itself, about its products or provide other information to users of the online system 120 using a brand page associated with the entity's user profile. Other users of the online system 120 may connect to the brand page to receive information posted to the brand page or to receive information from the brand page. A user profile associated with the brand page may include information about the entity itself, providing users with background or informational data about the entity.

The content store 205 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 205, such as status updates, photos tagged by users to be associated with other objects in the online system 120, events, groups or applications. In some embodiments, objects are received from third-party applications or third-party applications separate from the online system 120. In one embodiment, objects in the content store 205 represent single pieces of content, or content "items." Hence, online system users are encouraged to communicate with each other by posting text and content items of various types of media to the online system 120 through various communication channels. This increases the amount of interaction of users with each other and increases the frequency with which users interact within the online system 120.

The action logger 210 receives communications about user actions internal to and/or external to the online system 120, populating the action log 215 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 215.

The action log 215 may be used by the online system 120 to track user actions on the online system 120, as well as actions on third party systems XX30 that communicate information to the online system 120. Users may interact with various objects on the online system 120, and information describing these interactions is stored in the action log 215. Examples of interactions with objects include: commenting on posts, sharing links, checking-in to physical locations via a client device 110, accessing content items, and any other suitable interactions. Additional examples of interactions with objects on the online system 120 that are included in the action log 215 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 215 may record a user's interactions with advertisements on the online system 120 as well as with other applications operating on the online system 120. In some embodiments, data from the action log 215 is used to infer interests or preferences of a user, augmenting the interests included in the user's user profile and allowing a more complete understanding of user preferences.

The action log 215 may also store user actions taken on a third party system 130, such as an external website, and communicated to the online system 120. For example, an e-commerce website may recognize a user of an online system 120 through a social plug-in enabling the e-commerce website to identify the user of the online system 120. Because users of the online system 120 are uniquely identifiable, e-commerce web sites, such as in the preceding example, may communicate information about a user's actions outside of the online system 120 to the online system 120 for association with the user. Hence, the action log 215 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 210 by the application for recordation and association with the user in the action log 215.

In one embodiment, the edge store 220 stores information describing connections between users and other objects on the online system 120 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 120, such as expressing interest in a page on the online system 120, sharing a link with other users of the online system 120, and commenting on posts made by other users of the online system 120. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 120, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 220 also stores information about edges, such as affinity scores for objects, interests, and other users. Affinity scores, or "affinities," may be computed by the online system 120 over time to approximate a user's interest in an object or in another user in the online system 120 based on the actions performed by the user. A user's affinity may be computed by the online system 120 over time to approximate the user's interest in an object, in a topic, or in another user in the online system 120 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 220, in one embodiment. Alternatively, each interaction between a user and a specific object is stored as a separate edge. In some embodiments, connections between users may be stored in the user profile store 200, or the user profile store 200 may access the edge store 220 to determine connections between users.

In one embodiment, the online system 120 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 235 may generate stories for presentation to a user based on information in the action log 215 and in the edge store 220 or may select candidate stories included in the content store 205. One or more of the candidate stories are selected and presented to a user by the newsfeed manager 235.

For example, the newsfeed manager 235 receives a request to present one or more stories to an online system user. The newsfeed manager 235 accesses one or more of the user profile store 200, the content store 205, the action log 215, and the edge store 220 to retrieve information about the identified user. For example, stories or other data associated with users connected to the identified user are retrieved. The retrieved stories or other data are analyzed by the newsfeed manager 235 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 235 selects one or more of the candidate stories for presentation to the identified user.

In various embodiments, the newsfeed manager 235 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 200. The newsfeed manager 235 may also determine the order in which selected stories are presented via the newsfeed. For example, the newsfeed manager 235 determines that a user has a highest affinity for a specific user and increases the number of stories in the newsfeed associated with the specific user or modifies the positions in the newsfeed where stories associated with the specific user are presented.

The newsfeed manager 235 may also account for actions by a user indicating a preference for types of stories and selects stories having the same, or similar, types for inclusion in the newsfeed. Additionally, the newsfeed manager 235 may analyze stories received by the online system 120 from various users to obtain information about user preferences or actions from the analyzed stories. This information may be used to refine subsequent selection of stories for newsfeeds presented to various users.

The web server 240 links the online system 120 via the network 115 to the one or more client devices 110, as well as to the one or more third party systems 130. The web server 240 serves web pages, as well as other content, such as JAVA®, FLASH®, XML and so forth. The web server 240 may receive and route messages between the online system 120 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 205. Additionally, the web server 240 may provide application programming interface (API) functionality to send data directly to native client device operating systems, such as IOS®, ANDROID™, or BlackberryOS.

Selecting Content with an External Link for Presentation

Figure 3:
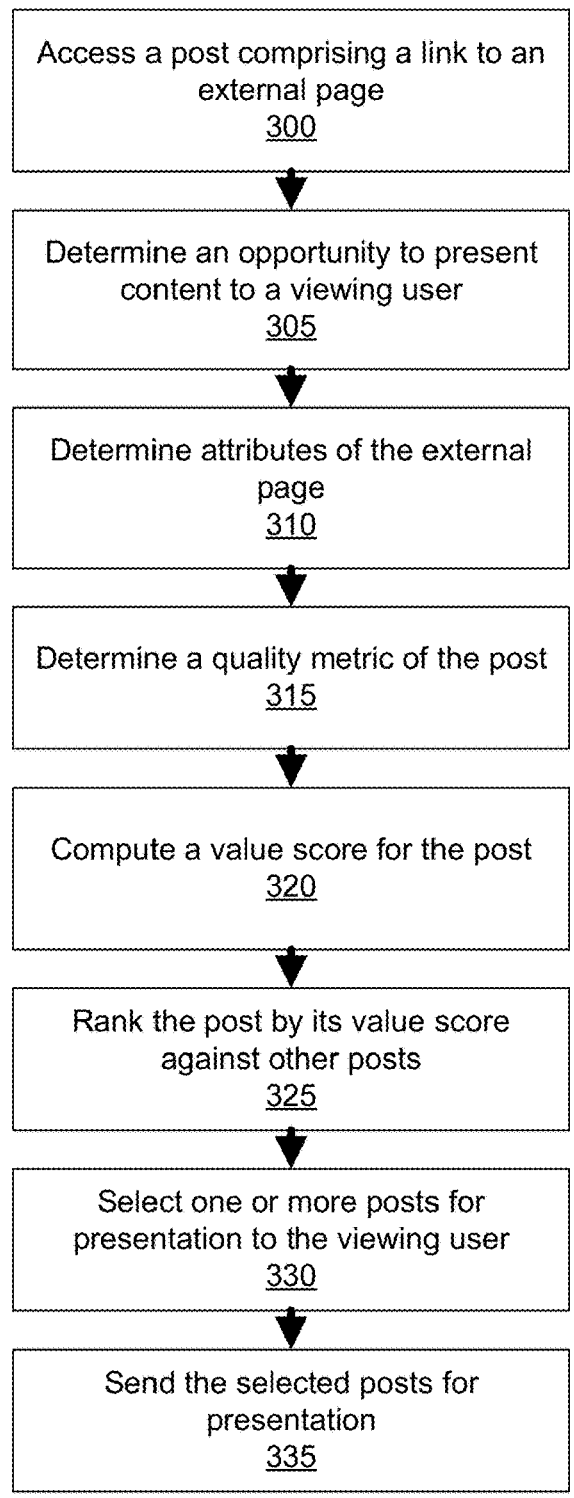
FIG. 3 is a flow diagram of a method for selecting a post comprising a link to an external page for presentation to a user of the online system, in accordance with an embodiment.

FIG. 3 is a flow chart illustrating a method for selecting content with an external link for presentation to a user of an online system according to one embodiment. In various embodiments, the method may include different and/or additional steps to those described in conjunction with FIGS. 3.

The online system accesses a post 300 for presentation to viewing users of the online system including a link to an external landing page. The post may be organic posts from individual users or sponsored content, such as advertisements, and may include additional forms of content such as text or images.. When the online system determines an opportunity to present content to a viewing user 305, the post is analyzed to determine a likelihood of interaction by the viewing user.

When the accessed post contains an external link, the likelihood of interaction and the quality of the post are related to the quality of the external landing page. The external link may include a URL to a web page, a deep link to a location within a mobile application, a link to an application store to install an application, or others. The corresponding external landing page may include a web page or a mobile application, such as a state or page in the mobile app defined by a deep link.

The quality of the post is associated with a bounce-back time, which is defined to the duration of time that a viewing user spends on the external landing page before navigating back to the online system. A long bounce-back time is associated with a positive experience with the post containing the external link, such as a high quality post or viewer interest in the content of the external page. A short bounce-back time is associated with a negative experience with the post, such as a low quality post or a lack of viewer interest in the content of the external page. The system defines a threshold time period to qualify a long versus a short bounce-back time.

The online system determines attributes of the external page 310 to evaluate the quality of posts with external links. In one embodiment, the online system pulls signals from the landing page associated with bad features such as a misleading title, slow load or technical glitch, not mobile friendly, advertisements, or others. Bad features are associated with a high likelihood of a short bounce-back time, and reflect negatively on the post on the online system. In another embodiment, the online system accounts for other features associated with the external landing page, including historical dwell time at the external link, user bounce-back rate, user average dwell time, relevance of the content topic to the user's interests, and others as well as features extracted from the page. Based on the associated signals and features, the online system determines a quality metric 315 of the post.

The quality metric of the post is computed using a machine learning model to predict whether the user will view the page for under the threshold time (i.e., a short bounce-back). The machine learning model is trained using historical data about previously presented posts and whether users of the online system viewed external pages linked to by those posts for more than the threshold period of time. Using this historical data, the machine learning model generates a baseline quality metric associated with the post containing the external link.

The trained model then uses features about the post containing an external link and about the external landing page to determine the likelihood that a particular viewing user interacts with the post. For example, the considered features may include whether the external landing page has a misleading title, a slow page load, technical glitches, excessive advertisements, or other negative features that may detract from a viewing user's experience of the landing page. Additionally, the trained machine learning model may use features about the viewing user as well as about the external page, thereby personalizing the computed likelihood of interaction. Features associated with the viewing user that may be used by the trained machine learning model include historical actions, such as the user's frequency of clicking; user profile attributes, such as age, gender, and interests; social attributes, such as the user's friends and information associated with the user's friends; and others.

From these features, the training model computes the likelihood for each new impression opportunity for each post. The computed likelihood is particular to both the post containing the external link and to the viewing user for whom the computer system is generating posts. This likelihood of an impression is then used to adjust the quality metric of the external landing page for the particular viewing user.

In one embodiment, the system differentiates between the viewing user's closing the external page versus navigating away from the external page. For example, the threshold period of time used to determine if a short bounce-back time occurs is computed as the time between the user navigating to the external page and the user closing the external page.

Posts competing for placement in an opportunity for presentation are ranked by a value score. The value score of a post is determined based on the likelihood that a viewing user will interact with the post in some way. An interaction does not necessarily require a clicking on an external link associated with a post. For example, in one embodiment, interactions may include liking a post, commenting on a post, sharing a post, or taking another action. Each action is associated with an action value. For example, sharing a post may be associated with a higher action value than liking a post. Using the likelihood of interaction, the online system determines a value score for the post 320, adjusted upward by the quality metric of the post.

$$\text{score} = \Sigma(p_{action})(\text{value}_{action}) + \alpha \cdot (\text{model} - p_{bounceback}) \quad \text{(Eq. 1)}$$

As one example shown in Equation 1, the value score is directly adjusted by the quality score. The value score is computed as the sum of the probability of actions $\rho_{action}$ occurring multiplied by the associated value of the action. The quality score is then adjusted upward by the quality metric, modified by a multiplier $\alpha$. In another embodiment, the quality score is used to adjust the value of the user visiting the external page. This action is associated with a likelihood that the user performs the action of visiting the external page, and the values are multiplicatively used to compute the score of the post. In other embodiments, the particular math formula used to compute the value score may be selected by the system operator, and may be modified from the examples shown above to any of several formulaic or empirical relationships between the quality score and the value score of a given post.

Based on the calculated value score of the post, the online system ranks the post 325 by its value score against other posts competing for placement in the opportunity. One or more of the competing posts are selected 330 for placement, based at least in part on their place in the ranking or on achieving a threshold position in the ranking. The selected posts are sent 335 to the viewing user for presentation.

In another embodiment, the model bounce-back time prediction is used to signal interest prediction for a viewing user on the topic of the external landing page. For example, a viewing user that spends more than a minimum amount of time on a page containing poor features such as title-content mismatch, technical glitches, advertisements, and others may be interested in the content of the page.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing a post from a posting user of an online system, the post comprising a link to an external page that is outside the online system;
   determining an opportunity to present content to a viewing user of the online system;
   determining one or more attributes of the external page;
   determining a likelihood of the viewing user viewing the external page for less than a threshold time period based on the attributes of the external page;
   determining a quality metric of the post for the viewing user based on the attributes of the determined likelihood of the viewing user viewing the external page for less than the threshold time period, where the quality metric decreases with a higher determined likelihood of the viewing user viewing the external page for less than the threshold time period;
   computing a value score presenting the post to the viewing user, the value score adjusted upward by the quality metric;
   ranking the post by its value score along with a plurality of other posts;
   selecting, based on the ranking, one or more of: the post and the plurality of other posts; and
   sending the selected posts for presentation to the viewing user.

2. The method of claim 1, wherein the determined quality metric of the post is a binary classifier based on the likelihood of the viewing user viewing the external page for less than the threshold time period.

3. The method of claim 1, wherein the attributes of the external page comprise one or more of: historical dwell time at the external page, a user bounce-back rate at the external page, and user average dwell time at the external page.

4. The method of claim 1, wherein the threshold period of time is computed as a time between the user navigating to the external page and the user closing the external page, and is independent of the user navigating away from the external page.

5. The method of claim 1, wherein computing a value score comprises:
   computing a plurality of value score components, one of the value score comprising an external page value score that is computed based on a likelihood of the viewing user viewing the external page and a value of the viewing user viewing the external page, where the value of the viewing user viewing the external page is adjusted upward by the quality metric; and aggregating the plurality of quality score components to determine the value score for the post.

6. The method of claim 1, wherein the post accessed by the online system may comprise: an organic post from an individual user, or sponsored content from a business or organization.

7. The method of claim 1, wherein the link associated with the accessed post comprises one or more of: a URL to a web page, a deep link to a location within a mobile application, and a link to an app store to install an application.

8. The method of claim 1, wherein the external page associated with the accessed post comprises one or more of: a web page, a mobile application, and a state or page within a mobile application defined by a deep link.

9. The method of claim 1, wherein the quality metric is further determined based on attributes associated with the viewing user.

10. The method of claim 1, further comprising:
   training a machine learning model using historical data about whether users viewed external pages for a threshold period of time after being presented with a post with a link to the external page; and
   using the trained machine learning model to compute a quality metric for a post containing a link to an external page.

11. A computer program product, comprising a computer-readable storage medium containing computer program code for:
   accessing a post from a posting user of an online system, the post comprising a link to an external page that is outside the online system;
   determining an opportunity to present content to a viewing user of the online system;
   determining one or more attributes of the external page;
   determining a likelihood of the viewing user viewing the external page for less than a threshold time period based on the attributes of the external page.
   determining a quality metric of the post for the viewing user based on the attributes of the determined likelihood of the viewing user viewing the external page for less than the threshold time period, where the quality metric decreases with a higher determined likelihood of the viewing user viewing the external page for less than the threshold time period;
   computing a value score presenting the post to the viewing user, the value score adjusted upward by the quality metric;
   ranking the post by its value score along with a plurality of other posts;
   selecting, based on the ranking, one or more of: the post and the plurality of other posts; and
   sending the selected posts for presentation to the viewing user.

12. The computer program product of claim 11, wherein the determined quality metric of the post is a binary classifier based on the likelihood of the viewing user viewing the external page for less than the threshold time period.

13. The computer program product of claim 11, wherein the attributes of the external page comprise one or more of: historical dwell time at the external page, a user bounce-back rate at the external page, and user average dwell time at the external page.

14. The computer program product of claim 11, wherein the threshold period of time is computed as a time between the user navigating to the external page and the user closing the external page, and is independent of the user navigating away from the external page.

15. The computer program product of claim 11, wherein computing a value score comprises:
   computing a plurality of value score components, one of the value score comprising an external page value score that is computed based on a likelihood of the viewing user viewing the external page and a value of the viewing user viewing the external page, where the value of the viewing user viewing the external page is adjusted upward by the quality metric; and
   aggregating the plurality of quality score components to determine the value score for the post.

16. The computer program product of claim 11, wherein the post accessed by the online system may comprise: an organic post from an individual user, or sponsored content from a business or organization.

17. The computer program product of claim 11, wherein the link associated with the accessed post comprises one or more of: a URL to a web page, a deep link to a location within a mobile application, and a link to an app store to install an application.

18. The computer program product of claim 11, wherein the external page associated with the accessed post comprises one or more of: a web page, a mobile application, and a state or page within a mobile application defined by a deep link.

19. The computer program product of claim 11, wherein the quality metric is further determined based on attributes associated with the viewing user.

20. The computer program product of claim 11, further comprising:
   training a machine learning model using historical data about whether users viewed external pages for a threshold period of time after being presented with a post with a link to the external page; and
   using the trained machine learning model to compute a quality metric for a post containing a link to an external page.

* * * * *